March 28, 1950 G. JAEGER ET AL 2,501,944
SEALING MEANS FOR MIXERS OR THE LIKE
Filed July 10, 1943 3 Sheets-Sheet 1

INVENTORS
Gebhard Jaeger
Clarence I. Bohmer
BY Corbett, Mahoney & Miller
ATTORNEYS March 28, 1950 G. JAEGER ET AL 2,501,944
SEALING MEANS FOR MIXERS OR THE LIKE
Filed July 10, 1943 3 Sheets-Sheet 2

INVENTORS
Gebhard Jaeger.
Clarence I. Bohmer.
BY Corbett, Mahoney & Miller
ATTORNEYS March 28, 1950     G. JAEGER ET AL     2,501,944
SEALING MEANS FOR MIXERS OR THE LIKE Filed July 10, 1943     3 Sheets-Sheet 3

INVENTORS
Gebhard Jaeger
Clarence I. Böhmer
BY Corbett, Mahoney & Miller
ATTORNEYS Patented Mar. 28, 1950

2,501,944

UNITED STATES PATENT OFFICE 2,501,944

SEALING MEANS FOR MIXERS OR THE LIKE

Gebhard Jaeger and Clarence I. Bohmer, Columbus, Ohio, assignors to The Jaeger Machine Company, Columbus, Ohio, a corporation of Ohio Application July 10, 1943, Serial No. 494,222

10 Claims. (Cl. 259—161)

The present invention relates to sealing means for mixers or the like. It has to do, particularly, although not exclusively, with an improved seal or sealing means which may be formed from any suitable non-metallic material which has the characteristic of flexibility, such as synthetic rubber, or the like which is particularly well adapted for use between and in cooperation with the opposed spaced faces or surfaces of a rotatable member and a non-rotatable member such, for example, as a rotatable mixing drum and a non-rotatable material-receiving hopper of a mixing machine.

While the invention finds a particularly useful purpose for sealing the joint between the mixing drum and hopper of a mixing machine against the entry thereinto of the ingredients or mix handled by the machine, it also serves to prevent the loss or escape of the lubricant, such as grease, which is applied to the opposed faces or surfaces of the mixing drum and material-receiving hopper. It will be understood that the improved seal or sealing means of the present invention is likewise equally well adapted for sealing or closing the space between the adjacent faces or portions of various types of articulated containers, compartments, or the like, especially those in which one of the units is subjected to rotary movement relative to the other unit and wherein it is desirable to seal the joint or space to prevent the ingress of material and the escape of lubricant which is applied to the opposed surfaces to reduce wear and friction.

In the past it has been particularly difficult, with known types of sealing means employed in connection with rotary mixers, to effectively seal the space or joint between the relatively rotatable members while permitting relatively free and easy rotation of the rotatable member. It has been difficult to seal the joint to prevent the escape or seepage of the lubricant applied to the opposed faces or portions of the members and particularly difficult to prevent the ingress of the materials of a mix from entering and clogging and thus damaging the joint between the rotatable drum and the non-rotatable hopper of a concrete mixer. In cases where previously known seals permitted the relatively free rotation of one member with relation to the other member, the undesirable leakage of the lubricant occurred and the materials entered the joint. This was particularly noticeable and objectionable in the case of portable rotary mixing machines which functioned to mix concrete in transit. In other cases where the known seals were partially efficient to prevent leakage of the lubricant, such as grease, the joint between the rotatable and the non-rotatable members and the seal therefor were so constructed in an effort to prevent such leakage that the rotatable member, such as the mixing drum, required the use or application of extremely high power or force to turn it. By virtue of the fact that the mixing drum of a portable concrete mixer, for example, when filled with the ingredients to be mixed, requires considerable power to rotate it because of the weight of the drum itself and the added weight of its contents, it is undesirable to employ sealing means which would increase the friction and the load and thus require greater power to turn the drum.

The present invention, therefore, contemplates the provision of an improved seal or sealing means which prevents the entry of deleterious materials to the joint and which is grease-resistant, durable and relatively easy to install, and which also permits the free rotation of one member relative to the other member by reducing friction on the parts while at the same time providing efficient sealing means which prevents the escape of the lubricant by confining or trapping it between the opposed faces or surfaces of the relatively rotatable members.

One of the objects of the present invention is to provide a seal or sealing means of improved nature which is inexpensive to manufacture, which does not require the use of critical materials and which effectively and efficiently seals the joints or space between relatively movable members to exclude deleterious materials and prevent the leakage of lubricant employed for lubricating such spaces.

Another object of the present invention is to provide an improved seal formed from suitable flexible, or pliable, non-critical material which is wear and grease or lubricant-resisting such, for example, as synthetic rubber.

Another object of the present invention is to provide a seal of the foregoing character which is adapted to be easily applied to one of a pair of opposed members and which has spaced means engageable with the other of said members to effectively seal the joint against the entry of foreign matter and to trap and thus prevent the escape of grease or other lubricant which is applied to the opposed faces of the members to reduce friction and wear.

Another object of the present invention is to provide an improved seal formed from flexible or pliable material such, for example, as synthetic rubber in the original form of a relatively flat ring which when attached or applied to one of the opposed faces will assume a frusto-conical shape engageable with the opposite face and which will move into a relatively flat face-engaging position when the opposed faces are moved toward one another to their positions of use.

A further object of the present invention is to provide a seal of the foregoing character in the form of a continuous annulus which is normally channel-shaped in cross section and which when applied to one face of a pair of opposed faces will assume a dual frusto-conical shape and then flatten out when the faces are moved to their final assembled positions.

A further object of the present invention is to provide a mixing drum and a material-receiving hopper having opposed substantially straight and parallel faces or surfaces cooperable with one another, in which one of said faces is provided with an annular recess or groove which is so shaped and proportioned as to receive and support a normally flat sealing ring of flexible nature and cause it to assume a frusto-conical shape prior to the movement toward one another of the opposed faces.

Another object of the invention is to provide an improved seal of the foregoing character which is capable of use to seal the space between a rotatable mixing drum and a non-rotatable material-receiving hopper in which the hopper is either movable away from the mixing drum to permit the discharge of material from within the drum or in which the hopper remains in fixed relation to the rotatable mixing drum and is provided with a discharge door in a wall thereof.

Another object of the present invention is to provide improved sealing means for sealing the space or joint between a rotatable member and a non-rotatable member in which said sealing means comprises a pair of spaced annular ring-like members formed from grease-resisting material which exclude foreign material from the joint and which are capable of sealing the space or joint to effectively trap and thus prevent the escape or leakage of the grease.

Another object of the present invention is to provide an improved mixer structure having improved sealing means located between the rotatable and non-rotatable parts thereof to which said parts are maintained in predetermined spaced relation with respect to each other and in which said predetermined space may be varied.

Another object of the present invention is to provide an improved mixing machine or apparatus having improved means for sealing the joint between the rotatable mixing drum and the hopper of the apparatus; it being a further object of the invention to provide an improved structure of this character with a hopper having an unobstructed interior to permit the free passage of materials therein.

A further object of the present invention is to provide an improved mixing apparatus and improved sealing means therefor, in which the apparatus includes a hopper having an unobstructed interior, together with means located outside the hopper for adjusting or regulating the size or spacing of the joint where the sealing means is located.

Another object of the present invention is to provide improved sealing means adapted to be located between the opposed sealing faces or surfaces of a rotatable member and a non-rotatable member, in which said sealing means is preferably in the form of one or more rings of molded synthetic rubber, and in which one of the opposed surfaces or faces may be provided with one or more annular grooves or recesses for receiving and supporting the sealing means and for maintaining said means in position without the aid of auxiliary fastening means for retaining said sealing means in operative position.

A further object of the present invention is to provide means for maintaining the rotatable mixing drum and the non-rotatable material-receiving hopper of a portable mixing machine or apparatus in predetermined spaced relation and to provide improved sealing means between the drum and hopper for effectively and efficiently sealing the space between said members against the entry of the materials from the drum and hopper and the leakage of grease or other lubricant which has been applied to the opposed portions or faces of said parts.

In one of its forms, our present invention contemplates the use of an improved seal to prevent the entry of foreign materials and substances and the leakage of grease between the non-rotatable but otherwise movable material-receiving hopper and the rotatable door or frusto-conical intermediate member located between the charge and discharge opening of the rotatable mixing drum and the hopper. In another form, our present invention contemplates the use of sealing means between the non-rotatable material-receiving hopper and the adjacent face or portion of the rotatable mixing drum of a portable mixing machine or apparatus in which the material is discharged from the mixing drum through an opening in the hopper which may, if desired be controlled by a slidable door carried by said hopper. In both forms of our invention, the sealing means is preferably formed from some suitable flexible grease-resisting material, such as synthetic rubber. In one form of sealing means, applicable to both types of mixing apparatus as described, we have provided a pair of spaced annular ring-like members which are removably secured in place in spaced grooves or channels formed in either the non-rotatable or the rotatable units of the mixer, the remaining portions of said members extending in inwardly inclined spaced relation toward the opposite unit and being adapted to assume a relatively flatwise position between the units when the units are moved together and held in predetermined spaced relation. In lieu of the two separate sealing rings and the spaced grooves or channels, a single wide ring and a single groove may be employed.

In another form of sealing means embodying our invention which is likewise adapted for use with the two types of mixing apparatus referred to above, as well as having many other uses, an annulus formed from grease-resisting synthetic rubber or the like and having a normal channel-like cross section, is seated in a previously formed annular groove located in either the hopper or the rotatable unit of the mixer. The groove is so formed as to cause the free portions or flanges of the channel-shaped annulus when seated therein to assume a dual frusto-conical shape with said portions extending outwardly and inwardly in substantially parallel relation toward the face of the adjacent unit. As the units are moved toward one another and held in predetermined spaced relation the portions or flanges of the annulus will assume relatively flat positions between the adjacent units and provide therebetween a space to trap and thus prevent the leakage of grease provided for the adjacent faces of the units in the region of said sealing means and also serve to efficiently seal the joint against the entry thereinto of foreign materials.

In still other forms of the invention as seen in Figures 10 to 13, inclusive, we have provided improved means for adjusting or regulating the space between the opposed sealing rings or members of the hopper and mixing drum, for supporting or suspending the mixing drum independently of the hopper, and for providing for a hopper whose interior is unobstructed to permit the free flow or passage of material therein.

The foregoing and other objects and advantages of the present invention will appear from the following description and appended claims when considered in connection with the accompanying drawings forming a part of this specification wherein like reference characters designate corresponding parts in the several views.

Figure 1:
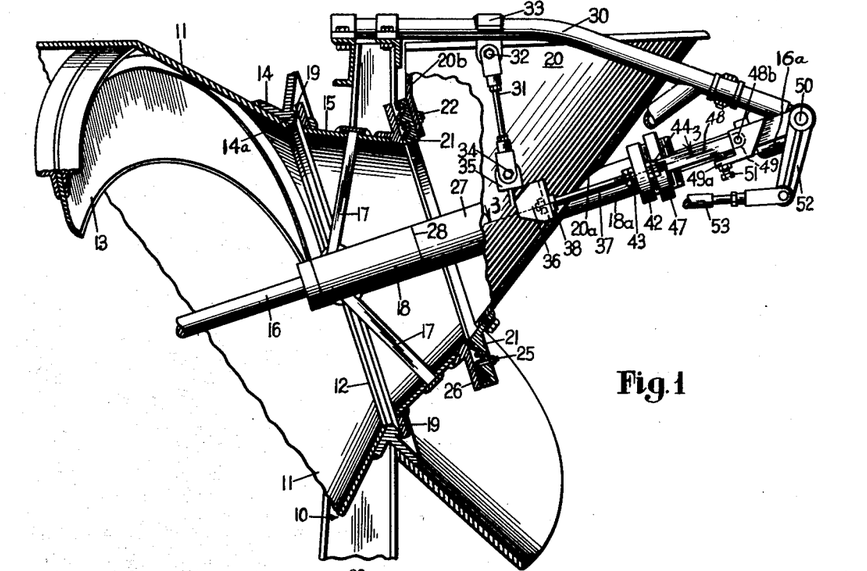
Figure 1 is a fragmentary side elevational view, partly in section, of a mixer structure and sealing means embodying the present invention, the parts being shown in closed or mixing relationship.
Figure 2:
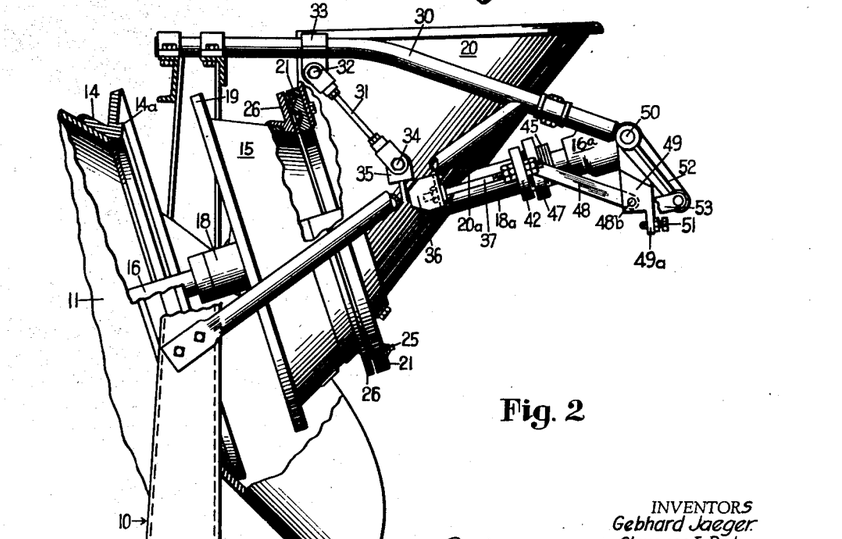
Figure 2 is a view similar to Figure 1, showing the parts in open or material-discharging relation.
Figure 3:
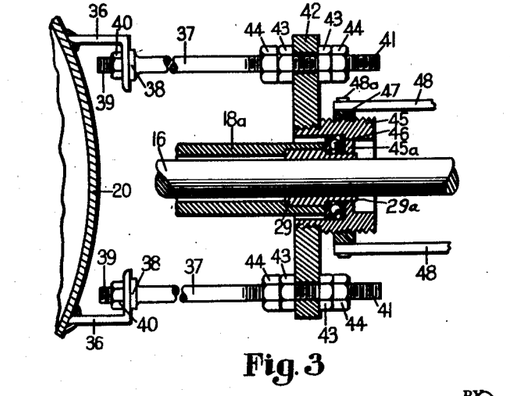
Figure 3 is an enlarged fragmentary sectional view taken substantially along the line 3—3 of Figure 1, looking in the direction of the arrows.

Referring now to the drawings and particularly to Figures 1, 2 and 3 thereof, there is shown a portion of an improved portable mixer of the type disclosed in our co-pending application Serial No. 438,432, filed April 10, 1942, now Patent No. 2,348,682, dated May 9, 1944, with which the improved sealing means of our present invention is incorporated.

As seen in Figures 1 and 2, the mixer comprises a frame or supporting structure shown as a whole at 10 for supporting an upwardly and rearwardly inclined rotatable mixing drum 11. The mixing drum is inclined as shown to provide a high discharge point for the mixing apparatus. The drum 11 is provided at its rear end with a circular opening or orifice 12. This opening is adapted to serve both as a charging opening and a discharging opening. The drum 11 is provided with suitably disposed mixing blades 13 of the screw type which terminate adjacent the opening 12. When power is applied to the drum to rotate it in one direction, the blades 13 function to draw in material supplied by the hopper to be later described, and feed it forwardly into the drum 11. When the drum is rotated in an opposite direction, the blades 13 function to force material outwardly from the drum through the opening 12. The drum 11 is provided with a flanged ring 14 which surrounds the opening 12 and which is secured in position upon the drum in any suitable manner, as by welding or bolting the parts together.

In the present form of mixing apparatus, we have provided an annular door 15 which, as shown, is of frusto-conical form and which is adapted to cooperate with the drum opening 12. This door 15, as shown, is supported for axial movement on a longitudinally extending shaft 16 which is supported centrally within the mixing drum 11 in any suitable manner so as to be rotatable with the drum 11. It will be understood that the shaft 16 extends rearwardly through the drum opening 12, the door 15 and the hopper. The door 15 is supported for axial movement on the shaft by means of a plurality of radial supporting arms or spokes 17 whose outer ends are secured to the door 15 in any suitable manner and whose inner ends are secured in any suitable and convenient manner to a cylindrical sleeve member 18. The tube or sleeve 18 is mounted for rotatable and also axial movement on an internal sleeve (not shown, the latter sleeve being supported on the shaft 16 for axial movement relative to the shaft.

The door member 15 is provided with an annular sealing ring or member 19, which as shown is located at the peripheral inner edge of the door and which is secured thereto in any suitable manner, as by welding. This sealing ring or member 19 has a flat forward face or surface which, as seen in Figure 1, is adapted to contact an annular relatively sharp or knife-like edge 14a formed on the mixing drum ring 14. Thus, when the parts are in the position in which they are shown in Figure 1, an effective seal will be provided between the drum 11 and the door 15.

Figure 6:
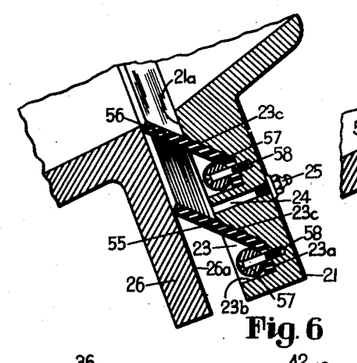
Figure 6 is a fragmentary sectional view, on an enlarged scale, showing one form of improved seal embodying the present invention, showing the normal position of the sealing means before the parts are moved together in spaced sealing relation.
Figure 7:
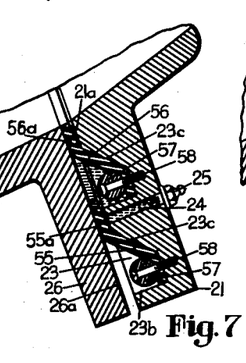
Figure 7 is an enlarged fragmentary sectional view showing the sealing means of Figure 6 in sealing position.

Disposed directly behind the door 15 is a substantially independent material-receiving hopper 20. This hopper is adapted to receive material and since it is provided with an inner circular opening which cooperates with the rear opening in the door 15, it will feed material into the door 15 from whence it passes into the rotatable mixing drum 11. As shown, the hopper 20 extends from a point located above the door 15 to the lower side thereof. The rear and side walls of the hopper are inclined downwardly and forwardly toward the door 15. The front wall of the hopper extends substantially vertically at 20b above the door 15. The front wall of the hopper, as stated above, is provided with an opening corresponding to the opening in the rear end of the door 15. Said hopper front wall carries a sealing ring 21 which surrounds and thus defines the opening in the hopper wall. This ring may be secured to the hopper in any suitable manner such as by bolting the parts together or welding them. As shown, bolts 22 are employed for the purpose. The sealing ring 21 is provided with a forward face 21a which is normally flat and which is also provided with a pair of transversely spaced annular grooves or recesses 23 which are best seen in Figures 6 and 7. As shown, the base portion 23a of each of the recesses is preferably flat. The outer wall or surface 23b of each of the recesses is straight and, as shown, extends at a right angle to the base wall 23a. The inner wall 23c of each of said recesses is, however, upwardly and inwardly inclined toward the outer flat face 21a of the sealing ring 21.

The sealing ring 21 is also provided with a port or passageway 24 provided with a lubricant or grease fitting 25 for supplying lubricant to the adjacent faces of the sealing rings or members on the hopper 20 and the door 15.

The forward face or surface 21a of the sealing ring 21 is adapted to cooperate with the flat face or surface 26a of a sealing ring 26 carried by the door 15. This sealing ring 26 is secured to the rear peripheral edge of the door 15 in any suitable manner, as by welding or by bolting or screwing the parts together.

The hopper 20 is provided in its rear wall with an opening 20a around which the rear end portion of a sleeve 27 is disposed. This sleeve is preferably welded to the rear wall of the hopper and extends forwardly in surrounding relationship to the inner sleeve 18a and abuts the rear end of sleeve 18, as at 28, see Figures 1 and 2. The sleeve 18a projects through the opening 20a of the hopper and beyond the rear wall thereof.

The rear end portion of sleeve 18a is provided with a bushing 29 and the forward end thereof with a similar bushing (not shown). These bushings serve to support the sleeve or tube 18a for axial movement on the shaft 16. A cap (not shown) is threaded onto the forward end of the sleeve or tube 18a to hold the bushing at said end in position. This structure is substantially the same as that shown in our co-pending application above referred to.

The hopper 20 is suspended from a framework 30 which extends rearwardly from the frame 10 of the mixer structure. The means for suspending the hopper comprises a pair of links 31, one thereof being provided at each side of the hopper. These links are of the turnbuckle type and each of them is pivotally or otherwise movably connected at its upper end, as at 32, to the frame 30 through the medium of hangers or clamps 33. The lower end of each of the links 31 is pivotally or otherwise movably connected at 34 to brackets 35 carried by the hopper. The links 31 are initially adjusted as to length, to bring the sealing ring or member 21 carried by the hopper 20 into proper sealing position and relationship with the sealing ring or member 26 carried by the door 15. By virtue of the fact that the gauge or wall thickness of the tubular member 27 is less than that of the tubular member 18, an annular space is provided between the member 27 and the inner tube member or sleeve 18a. Thus, there is allowed some vertical play between the hopper and the door 15. In other words, the hopper will be suspended in floating relationship with respect to the door 15 so as to be self-aligning relative thereto. This structure permits the sealing rings 21 and 26 to remain in proper sealing position even in the event the supporting frame 30 for the hopper should become bent or distorted in use. The links 31 are positioned so that their lower ends at 34, 35 remain in a position to the rear of their upper end connections at 32, 33 when the parts or units of the mixer are in cooperative relationship as shown in Figure 1 as well as when the door 15 and the hopper 20 are in open position removed from the mixing drum 11 as shown in Figure 2. In this latter figure, the location of the lower connecting portions 34, 35 of the links is considerably beyond or to the rear of the upper connections for these links. By reason of this arrangement of the links 31 the tendency of the hopper 13 will be to swing forwardly at all times thus tending to maintain the seal at the locality of the sealing rings or members 21 and 26. Actually, in the present structure and with the present improved sealing means, the sealing rings 21 and 26 are at no time in actual contact, as will be seen hereinafter. In this connection, attention is directed to the position of these members shown in Figures 1, 2 and 3, wherein it will be seen that the opposed faces 21a and 26a are maintained in spaced relation.

In view of our improved sealing means as embodied in the present invention, it is desirable to maintain the opposed faces of the cooperating rings 21 and 26 in predetermined spaced relation. The size of the space, that is, the distance between the opposed faces 21a and 26a, may be varied as desired. We have discovered that one such desirable spacing is approximately one-quarter inch, this being true in the case where we desire to employ a flexible seal, to be presently described, which has a thickness of approximately one-eighth inch.

To maintain the desired spacing between the members 21 and 26 and to provide for the adjustment or varying of this space, we have provided suitable adjustment means connected at one end to the hopper 20 and at the other or rear end to a plate-like bracket member or support carried indirectly by the non-rotatable inner tube member or sleeve 18a. Such means is best shown in Figure 3. It will be noted that the hopper 20 is provided with a pair of spaced bracket members 36 which are adapted to receive and support a pair of transversely spaced longitudinally extending rods 37. Each of the rods is provided adjacent its inner or forward end with an enlargement or abutment 38 and with a threaded inner end portion 39. The rods 37 are passed through openings formed in the bracket members 36 and nuts 40 are applied to hold the rods or bolts 37 in fixed relation with respect to the brackets. The outer or rear end portion of each of the rods is threaded at 41 and extends through an opening formed in a plate-like bracket or supporting member 42. To secure the rod in adjusted position against relative longitudinal movement with respect to the member 42, a pair of inner adjusting nuts 43 is provided, one on each side of the plate member 42. Lock nuts 44 are threaded onto the ends 41 and serve to lock or hold the nuts 43 in tightened condition. It will be understood that by loosening the nuts 43 and 44 of both rods or one of them, the rods 37 and the hopper 20 to which they are connected may be moved toward or away from the door 15 so as to vary the space or clearance between the opposed faces of the sealing ring members or flanges 21 and 26. In this connection it is to be understood that while we have shown, simply for purposes of illustration, the ring members 21 and 26 as being attached to the hopper and the door members 20 and 15, respectively, these members 21 and 26 may, if desired, be formed integral with their respective units.

As seen in Figure 3, an externally threaded sleeve or collar 45 is telescoped over the shaft 16 and has a centrally apertured web portion 45a to receive the reduced end portion 29a of the bushing 29. A ball bearing assembly 46 engages the reduced portion 29a of the bushing and provides a support for the threaded sleeve or collar 45. The inner end portion 45a of the collar is reduced and externally threaded to cooperate with the internally threaded opening or aperture formed in the member 42. By virtue of this construction it will be understood that while the member 42 may be tightened onto the collar 45, this member normally remains in a fixed position as shown in the drawings and thus provides an immovable support for the rods or bolts 37. Moreover, by reason of the structure shown the rod 16 is free to rotate with the mixing drum 11 without affecting the position of the space-adjusting or space-varying rods 37, the member 42 and their associated parts.

As in our co-pending application Serial No. 438,432, the hopper 20 and the door 15 are capable of axial movement relative to the shaft 16 toward and away from the mixing drum opening 12. For the purpose of moving these parts, as a unit, relative to the mixing drum and for maintaining them either in open position as shown in Figure 2 or in closed position as shown in Figure 1, we have provided a toggle structure as seen in Figures 1, 2 and 3. This structure is substantially the same as that disclosed by our co-pending application above referred to and comprises a structure which is non-rotatably supported by the outer or rear end of the shaft 16. The collar 45 is provided with a rotatable and adjustable internally threaded ring 47. The toggle mechanism comprises two pairs of links 48 and 49 arranged at opposite sides of the non-rotatable cap 16a carried at the outer or rear end of the shaft 16. The links 48 at their inner or forward ends are pivotally connected at 48a to the ring member 47 and at their outer or rear ends are pivotally connected at 48b to the links 49. The links 49 at their outer or rear ends are mounted upon and movable with an oscillatable transversely extending shaft 50 supported in a bearing carried by the frame 30. Each of the links 49 is provided with a forward extension 49a which carries an adjustable stop screw 51 which, when the parts are in the position in which they are shown in Figure 1, will contact the lower or under edges of the links 48 to maintain the parts, that is, the door 15 and the hopper 20 in closed position with the sealing ring 19 engaging the sharp edge 14a of the sealing ring 14 carried by the mixing drum. Thus, it will be seen that the movement of the door 15 and the hopper 20 axially or longitudinally of the shaft 16 is effected by the operation of the toggle member.

If it is desired to adjust the pressure or force of the sealing member or ring 19 upon the sealing member 14 of the mixing drum 11, this may be accomplished by adjusting the threaded ring 47 along the collar 45 to lengthen or shorten the throw or movement of the toggle mechanism as desired. Thus, it is possible to provide the desired degree of force or pressure of engagement between the members 14 and 19.

One end of the oscillatable shaft 50, see Figures 1 and 2, is provided with a depending crank arm 52 to the lower end of which is pivotally connected a longitudinally extending rod 53 which at its forward end is connected to suitable mechanism, such as a handwheel (not shown) which provides manually controlled means for operating the toggle mechanism to shift the door and hopper relative to the mixing drum. This mechanism may be similar to that disclosed by our aforesaid co-pending application.

Referring now particularly to Figures 6 and 7 of the drawings, there is shown one form of flexible sealing means embodying our invention for sealing the space or clearance which is normally maintained between the sealing members or rings 21 and 26. As stated above, we prefer to use for this purpose some suitable flexible grease-resisting material such, for example, as synthetic rubber, although various other materials may prove desirable for this use. We have discovered that a very desirable sealing means may be provided by cutting out a ring of synthetic rubber or other material from a flat sheet thereof so as to provide a flat flexible ring. We have discovered also that by using two such rings in spaced relation, a most desirable, effective and efficient seal is obtained. Two such rings are shown at 55 and 56 in Figure 6. It will be seen that these rings 55 and 56 are located or seated in the grooves or channels 23 formed in the body of the sealing ring or flange 21. The inner ends of the rings lie flat against the bottom wall or surface 23a of the grooves and are secured in place therein in any suitable manner, as by means of wire rings or bands 57 which are held in place by circumferentially spaced screws or bolts 58 which are passed through holes formed in the sealing rings and are threaded into the body of the member 21. The remainder of the sealing ring members 55 and 56 lie normally in flatwise relation upon the inclined faces 23c of the grooves and extend outwardly and inwardly beyond the flat face 21a toward the opposed flat face 26a of the sealing member or flange 26 carried by the door 15. Thus, as seen in Figure 6, the exposed portions of the flexible sealing rings 55 and 56 provide, in effect, dual frusto-conical annular members in transversely spaced relation providing a pocket therebetween which pocket is defined by the sealing rings themselves and by the opposed faces of the members 21 and 26. After the sealing rings have been installed in the member 21, said member is moved toward the adjacent opposed member 26 and the adjustable spacing means is set to maintain the opposed faces 21a and 26a in a given and predetermined spaced relationship. By reason of the fact that the flexible annular sealing rings 55 and 56, prior to the movement of the members 21 and 26 together or toward one another, lie in inwardly extending planes, when the member 21 is moved into closer relationship with the member 26, the free end portions 55a and 56a of the flexible sealing rings will be moved inwardly and will lie substantially flatwise against the face 26a of the member 26. The parts 21 and 26 are adjusted so that a relatively small space or clearance will remain between the face 21a and the adjacent faces of the portions 55a and 56a of the sealing ring. Therefore, any tendency on the part of material being fed from the hopper 20 into the door 15 and mixing drum 11 and passing over the joint between the members 21 and 26 or any moisture from such material, will tend to force the free edge or portion 56a of the inner sealing ring into closer contact with the face or surface 26a and thus exclude such material or moisture from the joint.

As stated previously, the sealing member or flange 21 is provided between the grooves 23 with a grease or lubricant duct or passage 24 and with a grease fitting 25 in communication with said duct. The purpose of this lubricant-applying means is to permit the application of grease or the like to the opposed faces 21a and 26a of the non-rotatable hopper 20 and the rotatable door 15, respectively, to reduce friction between these relatively rotatable parts to thereby reduce wear on the parts and likewise permit free and easy rotation of the door 15 with relation to the hopper 20.

In previously known portable mixing apparatus the objectionable feature of leakage or dripping of the grease or other lubricant from the space or joint between the rotatable and non-rotatable units of the apparatus has been present. This was undesirable and unsightly and furthermore was detrimental to the apparatus since with such previously known constructions it was necessary to constantly grease the joint due to the more or less constant leakage of the grease or other lubricant. In cases where there was no leakage, the joints or sealing means were of such a nature and required such close and accurate fitting that undue friction between the parts was produced which caused wear and which required excess power to rotate the mixing drum. It will be noted that in our improved structure and by virtue of the arrangement of the sealing rings 55 and 56, the grease or other lubricant supplied to the space between the opposed faces 21a and 26a in the region of the sealing ring is trapped between the rings and cannot escape. Any pressure exerted by the grease upon the free portion 55a of the outer sealing ring will only tend to force said portion into closer or more intimate contact with the face 26a and thus increase the sealing characteristics of the flexible ring 55.

Moreover, the presence of grease between the members 55 and 56 will force the inclined portion of sealing member 56 into closer contact with the inclined surface 23c and thus effectively seal the joint or space between the members 21 and 26 against the entry into the joint of the material or materials present in the mixer units. Thus, the flexible seal member 56 performs the important dual functions of sealing against leakage or oozing of grease into the mixer and the exclusion of foreign materials or substances from the joint. It is to be understood that the grease or other lubricating substance which is supplied to the space between the members 21 and 26 in the region of the flexible sealing means, is under some degree of pressure. In other words, the body of lubricant has some "head" on it and will thus have a tendency to not only force portions of the flexible sealing members into intimate engagement with adjacent surfaces of the members 21 and 26, but will also tend to enter between the free end portion 56a of the inner sealing ring and the face or surface 26a of the flange 26. The presence of this film of lubricant serves to exclude fines from within the drum and hopper which otherwise might enter the space between the surfaces of the sealing members or flanges 21 and 26 and thus cause wear on the parts and on the flexible sealing rings 55 and 56. Moreover, the film of lubricant between the so-called free end portions of the flexible sealing rings and the adjacent faces or surfaces of the sealing member or flange with which they are in contact, provides a lubricant to thus reduce friction and wear on the flexible sealing rings as the drum revolves relative to the rings and the hopper.

Figure 8:
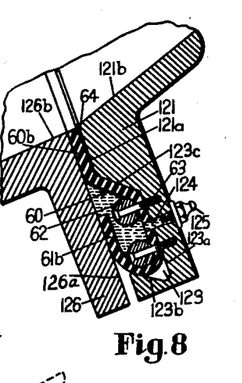
Figure 8 is a view similar to Figures 6 and 7 illustrating another form of sealing means embodying the present invention, the parts being shown in sealing position.

Referring now particularly to Figure 8 of the drawings, there is shown therein a somewhat modified form of sealing means embodying the invention. In accordance with the present form, the sealing ring or flange member 121 on the hopper 20 is provided with a single annular groove or channel 123 which is of substantially the same shape as the channels 23 of Figures 6 and 7 except that both the inner and outer walls or faces 123c and 123b, respectively, of the channel are upwardly and inwardly inclined and extend in substantially parallel planes. The base portion or bottom 123a of the groove or channel is flat. The wall of member 121 is drilled to provide a lubricant duct or passage 124 into which is threaded a fitting 125. The passage 124 communicates with the groove 123.

The sealing means for this form of the invention comprises a normally flat ring of material, such as synthetic rubber, which is shown as a whole at 60 and which is cut or otherwise removed from a flat sheet of the material. The ring of material in its flat state is positioned within the groove 123 and is secured in position therein by means of a pair of transversely spaced annular ring members or bands 62 which are held in place by screws or bolts 63 which pass through the base portion of the sealing member 60 and are threaded into the body of the member 121. The securing in place of the normally flat ring-like member 60 causes its end portions 60b and 61b to extend outwardly from the groove and inwardly toward the opposed face 126a of the sealing member 126, the portions 60b and 61b normally assuming spaced substantially parallel positions similar to the positions of the sealing members 55 and 56 shown in Figure 6. When the member 121 carrying the seal 60 is moved toward the member 126, the end portions 60b and 61b of the sealing member are moved into the positions in which they are shown in Figure 8 with these portions lying in flatwise positions between the opposed but slightly spaced faces of the members 121 and 126. It is to be noted that the member 60b terminates at the inner end of the joint between the opposed sealing members and that the longitudinal edge of the portion 60b is substantially flush with the inner or top surfaces 121b and 126b. It is also to be noted that a relatively small space or clearance 64 remains between the face 121a and the adjacent face or surface of the portion 60b. Thus, any material or moisture from said material passing over the joint will tend to force the seal portion 60b into closer contact with the wall or face 126a. Moreover, the pressure exerted by the grease entering through passage 124 and trapped between the portions 60b and 61b of the sealing member will likewise tend to force the inclined portion of the member 60b into closer and more effective sealing relation with the inclined wall 123c of the groove. This pressure likewise tends to force the flat outer portion 60b of the sealing member upwardly in the space or joint and thus effectively resist the entry of any material contained within the hopper, door and mixing drum. This feature of the invention is particularly important where the seal is employed in connection with an apparatus such as that disclosed in Figure 4 of the drawings and wherein the material of the mix passes over the joint in one direction, i. e. when the mixing drum is being charged and in the opposite direction over the joint when the material is being discharged from the mixing drum. In other words, with the type of apparatus shown in Figure 4 wherein a slidable door is provided directly in the wall of the hopper, the joint is subjected to twice the amount of wear as in the case of the type of apparatus shown in Figures 1 and 2.

The pressure of the grease or other lubricant within the space between the sealing members 60b and 61b will also force the portion 61b into intimate contact with the face 126a and thus effectively seal the joint and prevent the escape of the lubricant. Therefore, it will be seen that the sealing means 60 performs the dual function of preventing foreign material and matter from entering the joint and also serves to trap the lubricant, such as grease, within the joint in the region of the sealing means and thereby prevent its escape therefrom through the space at the outer portion of the sealing joint.

Figure 9:
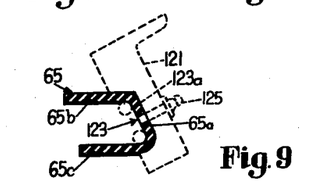
Figure 9 is a detail view showing another form of seal embodying the invention, in its normal or non-sealing position.

A somewhat further modified form of sealing means is shown in Figure 9. In this form of the invention we contemplate the use of an annulus 65 of normally channel-shaped cross section which is preferably formed from some suitable flexible grease, chemical and acid-resisting material such for example as synthetic rubber, by a molding process. It is to be noted that while in its original form the leg or projecting portions 65b and 65c extend at substantial right angles to the base or web portion 65a, when the annulus is inserted in position within the groove or annular recess 123 formed in the flange 121, the base portion 65a lies flat against the bottom wall 123a and the flanges or portions 65b and 65c extend outwardly from the groove in inwardly inclined directions and in substantial parallelism. The base 65a of the sealing member is provided with a hole or opening in communication with the port or passage 124 to allow grease or other lubricant to enter the space defined by the portions 65a, 65b and 65c. The sealing device 65 is secured in place within the groove 123 in substantially the same manner as the sealing device 60 of Figure 8 is secured in position. For this purpose wire rings or bands which are transversely spaced and which are held in position by screws or the like (not shown) are used. It will be understood that as in the preceding forms of sealing means as shown in Figures 6, 7 and 8, the portions 65b and 65c of the present seal will assume positions corresponding to the positions of the portions 60b and 61b of the seal shown in Figure 8 when the parts are moved into opposed and slightly spaced cooperative positions. Thus, the seal 65 will serve to efficiently seal the joint or space between the opposed members and will exclude material passing over the upper portion of the joint and will also serve to trap the lubricant within the joint and prevent any possibility of leakage.

Referring again to Figure 8, it will be seen that the parts are shown in their normal position of use, the sealing ring or flange member 121 having been moved toward the opposed member 126 to engage the leg portions or flanges 60b and 61b of the sealing annulus to cause said portions to assume the positions in which they are shown. As in the form illustrated in Figure 7, the opposed members 121 and 126 are spaced apart a distance which is slightly in excess of the thickness of the seal portions 60b and 61b. These portions engage the face or surface 126a in substantially flatwise relation, as previously described.

Figure 9A:
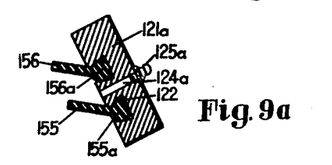
Figure 9a is a view similar to Figure 9 but showing a somewhat modified form of sealing means embodying the invention.

In Figure 9a of the drawings we have shown a somewhat further modified form of sealing means embodying the present invention. In this form, it is unnecessary to provide auxiliary fastening means or devices for maintaining the seal in operative relation to the seal-supporting member. As shown, the sealing member or flange 121a is provided with a pair of transversely spaced annular dovetailed grooves or slots 122, the body of the flange being provided, between said grooves, with a grease port or passageway 124a and with a conventional grease fitting 125a.

As shown in Figure 9a, the seal comprises a pair of preferably molded flexible annular sealing rings or members 155 and 156 having enlarged base portions or beads 155a and 156a, respectively. The sealing rings or members are preferably formed from some suitable flexible and compressible material such, for example, as synthetic rubber and the enlarged base portions or beads of these members are of sufficient size to maintain the members in place after the beads have been pressed or forced into the dovetailed slots 122. While these beads are sufficiently flexible and compressible so that the material thereof can flow or be deformed to cause them to enter the slots 122, it is to be understood that the beads are sufficiently stiff to maintain the sealing members in position within the slots against accidental displacement during use. As in the preceding forms of the invention, the body portion of the sealing ring 156 when in operative position, will lie in a relatively flat position between the inner face of the flange or member 121a and the opposed flange or member (not shown) in the same manner as do the sealing members shown in Figures 6 to 8, inclusive. Moreover, when the parts are assembled in their operative relationship, the joint between the flanges will be adequately sealed against the entry of foreign matter and will also be lubricated, the lubricant being trapped by the cooperation of the sealing members 155 and 156 and the faces of the sealing flanges, one of which is shown in Figure 9a. In other words, the improved sealing means of Figure 9a functions in the same efficient manner as do the sealing members of the preceding forms of our invention and do not require the use of any auxiliary fastening or securing means to hold them in place. While we have described the members 155 and 156 as being formed, preferably by molding, from synthetic rubber, it is to be understood that other suitable materials may be employed and the members may be formed in other ways than by molding.

Figures 4, 5:
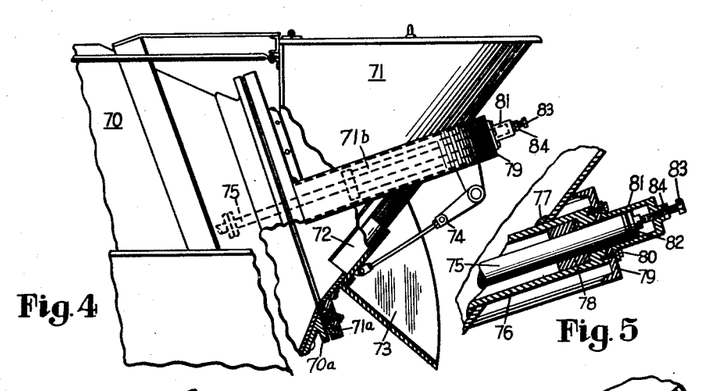
Figure 4 is a fragmentary side elevational view, partly in section, illustrating another form of mixer and sealing means embodying the present invention.
Figure 5 is an enlarged fragmentary detail view illustrating one form of means for adjusting the relative positions of the non-rotatable and rotatable units of Figure 4.

The several forms of sealing means embodying the present invention have been described for use in connection with the type of mixing apparatus shown in Figures 1 and 2 of the drawings. It will be understood, however, that our improved sealing means may be employed in connection with other and various types of mixers, as well as in connection with the opposed surfaces of any two members in which one of the members is capable of rotary movement relative to the other member. One such type of mixer to which our invention is applicable is illustrated in Figures 4 and 5 of the drawings. This type of mixer is substantially like that disclosed in the patent to Visser No. 2,316,137, patented April 6, 1943.

The mixer shown in Figures 4 and 5 comprises a mixing drum 70 carried by suitable frame structure of the apparatus and a material-receiving hopper 71 provided in its rear wall with an opening which is sealed by a slidable door or gate 72 which allows the contents to be discharged into a spout 73. Suitable mechanism for actuating the door 72 is shown generally at 74.

In the present instance the drum 70 and the hopper 71 are provided with cooperating openings. The opening in the drum is, as shown, provided with an annular flange 70a having a flat annular face which is adapted to be opposed to and cooperate with a somewhat similar flange 71a having a similar flat face, the flange 71a being carried by the hopper 71. The flange or sealing ring 71a in its inner face may be provided with a pair of annular grooves similar to the grooves 23 of Figures 6 and 7 or with a single annular groove similar to the groove 123 of Figures 8 and 9. These grooves are, as in the previously described type of mixer, adapted to receive and support either the separate sealing means of Figures 6 and 7, the single sealing member of Figure 8, or the normally channel-shaped annulus of Figure 9. It will be understood that the sealing means 55 and 56 or the sealing means 60 or 65 all function in the same manner in connection with the mixer of Figure 4 as explained in connection with Figures 1 and 2.

As explained above, it is particularly desirable to provide an efficient and durable sealing device for the joint or space between the members 70a and 71a of the type of mixer shown in Figure 4 and it has been difficult heretofore to effectively seal such a joint for the reason that it is subjected to harder use and consequently greater wear than other types of mixer joints because all of the material from the hopper 71 must necessarily pass over the joint on its way to charge the mixing drum and the resultant mix must likewise pass over the joint during the operation of discharging the material into the chute 73. We have discovered however that our improved sealing means, in all of its forms herein disclosed, provides an efficient seal for the joint of Figure 4 and said seal serves to exclude completely any of the materials handled by the apparatus as well as to trap or seal the grease or other lubricant supplied to the joint and prevent its escape or leakage.

It will be understood that the entry into the joints such as those illustrated in the apparatus shown in the drawings is highly undesirable since the sand and other ingredients of the concrete mix tend to attack and wear the opposed faces or surfaces of the joint as well as conventional forms of sealing means. The undesirable entry of such materials additionally tends to clog the joint and interferes with the desirable freedom of rotation of one of the units relative to the other unit. These undesirable features of the prior art structures have been completely and entirely overcome by virtue of the novel sealing means and related structure disclosed by the present application.

The apparatus of Figures 4 and 5 includes a longitudinal rearwardly extending shaft 75 which is secured to a portion of the mixer drum structure so as to revolve therewith. The outer or rear end of the shaft extends through and projects beyond a tubular member 76 which likewise projects rearwardly of the hopper wall through an opening formed in said wall, the tube being fixed to the hopper in any suitable manner as by means of welding as indicated generally at 77. The tube 76 is provided with a bushing 78 through which the shaft extends and the end of the tube is provided with a cap or cover 79 held in place by bolts or screws 80. An additional cap or cover 81 is provided for enclosing the outer or rear end of shaft 75. A thrust bearing assembly 82 is provided against which the end of the shaft rests. The tube and shaft are supported at their outer ends from the hopper by means of a bowed member or yoke 71b. The shaft 75 is capable of being adjusted longitudinally to vary the space between the sealing ring members or flanges 70a and 71a by an adjusting screw 83 which seats in a cap portion of the bearing assembly 82 and which is locked in adjusted position by a lock nut 84. In other words, the apparatus of Figures 4 and 5 is provided with stop means for maintaining and locking the opposed sealing rings or bearing portions 70a and 71a in predetermined spaced relation to permit the proper functioning of the flexible sealing means shown in Figures 6 to 9, inclusive.

Figures 10, 11, 12:
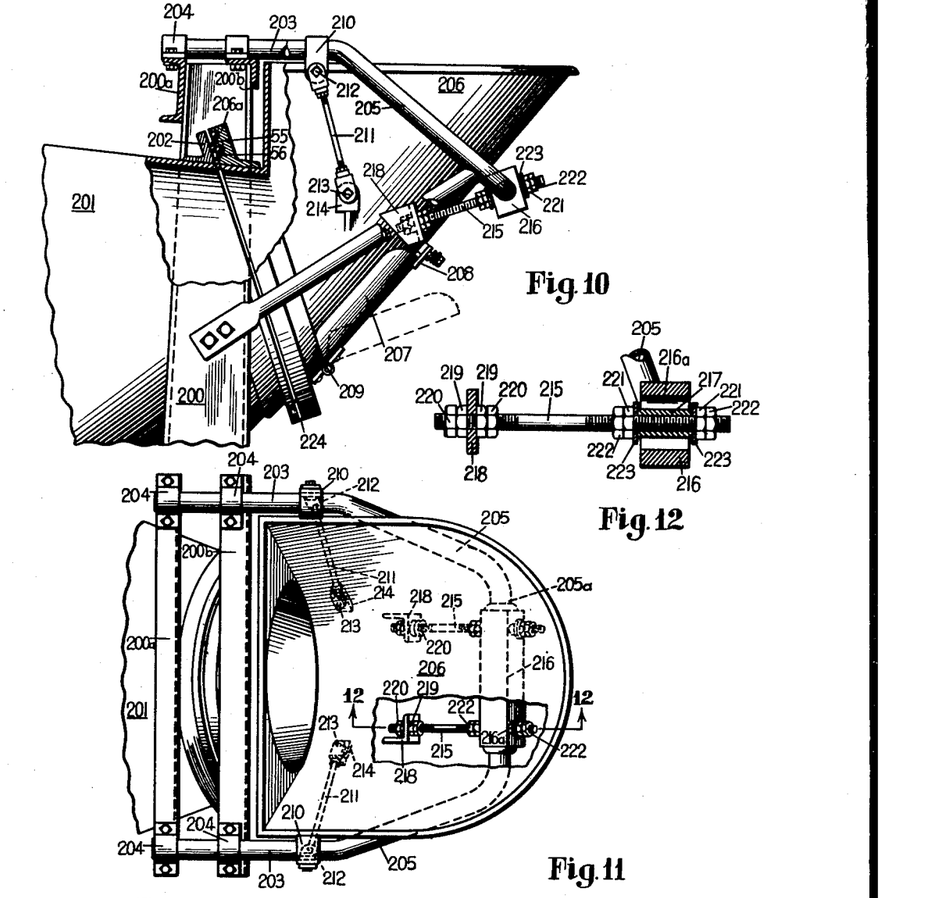
Figure 10 is a view similar to Figure 4 and showing a somewhat further modified form of mixing apparatus and seal embodying our invention in which the interior of the hopper of said apparatus is free and unobstructed, and wherein improved means is provided for adjusting or varying the size of the sealing joint or space between the hopper and mixing drum.
Figure 11 is a top plan view of the structure shown in Figure 10.
Figure 12 is an enlarged fragmentary sectional view taken substantially along the line 12—12 of Figure 11, looking in the direction of the arrows.

Referring now particularly to Figures 10, 11 and 12, we have shown in these figures a somewhat modified form of structure embodying our present invention. In these particular views, the apparatus embodying the invention comprises a supporting frame structure 200 for supporting a rotatable mixing drum 201 having an opening formed in its rear end, said opening being surrounded or defined by a sealing flange or member 202.

The frame structure 200 is provided at its upper rear end with a rearwardly extending substantially U-shaped auxiliary supporting frame, shown as a whole at 203. This frame, as shown, is formed from pipe or tubing having leg portions which are secured by strap members or clamps 204 to the upper surfaces of cross frame members 200a and 200b forming a portion of the frame 200. The auxiliary frame 203 extends rearwardly and downwardly at 205 and transversely at 205a and is spaced from and encircles a portion of a self-aligning and movable hopper, shown as a whole at 206. The hopper is provided in a lower wall thereof with a hinged door 207 and with latching means 208 for holding the door in its closed position as shown in full lines, Figure 10. The door, as shown, opens downwardly from its upper or free end and is mounted for swinging movement at 209.

As in the preceding form of our invention as shown in Figures 1 and 2 of the drawings, the frame portions 203 provide means for suspending or supporting the self-aligning hopper 206. For this purpose, we have provided the transversely spaced portions 203 with bracket members or straps 210 to which the upper ends of a pair of transversely spaced adjustable link members 211 are connected. The upper end of each member 211, see Figure 10, is movably or pivotally connected at 212 to one of the strap members 210. Its lower end portion is similarly movably or pivotally connected at 213 to a bracket or support 214 carried by the wall of the hopper 206. Thus, both ends of the link 211 are movably mounted or connected.

It is to be understood that the upper pivotal connections or points 212 for both adjustable link members 211 are located nearer to the rear open end of the drum 201 than are the lower pivotal points or connections 213 for said adjustable link members 211. Thus, the link members at opposite sides of the hopper 206 extend from their lower points of connection at 213 upwardly and forwardly toward the mixing drum to their upper pivotal connecting points 212. Therefore, by virtue of the position and arrangement of the members 211, the hopper is floatingly suspended and its normal tendency is to swing forwardly toward the mixing drum to cause its annular bearing face or surface 206a to tend to engage the opposed face of the bearing ring or portion 202 carried by the mixing drum. This tendency will be increased due to the inherent weight of the hopper and to the additional weight of the material within the hopper.

It is to be understood that there is a clearance maintained between the walls of the hopper 206 and the surrounding and supporting or suspending frame portions 203 and 205, thus allowing horizontal as well as vertical movement of the hopper 206 with relation to the supporting frame structure and also with relation to the mixing drum to provide for the self-aligning of the hopper with relation to the drum.

As in the preceding forms of the present invention, it is desirable to maintain a predetermined space or clearance between the adjacent opposed bearing surfaces or faces 202 and 206a so that the improved flexible sealing means as represented generally by the reference characters 55 and 56 and which is similar to said means as shown particularly in Figures 4, 6 and 7 of the drawings, or which may be similar to the forms shown in Figures 8 or 9, will function in like manner to the several forms of sealing means as shown in said preceding views. It is to be noted that the sealing means or members 55 and 56 are supported in spaced grooves formed in the bearing member or face 206a in substantially the same manner as the corresponding sealing members are supported in Figures 6 and 7.

In the form of our invention as shown in Figures 10, 11 and 12, it is desirable to provide the hopper 206 with a free and unobstructed interior so as to permit the free passage of materials through the hopper and into the mixing drum 201. Therefore, we have provided sealing joint spacing or adjusting means which is located exteriorly of the hopper 206. In the present form of the invention, such adjusting or sealing joint regulating means comprises, as shown, a pair of transversely spaced longitudinally extending threaded rods or members 215 which rods extend through and may be adjusted lengthwise in transversely spaced sleeve members 217 located in separate vertically elongated openings or slots 216a formed in a transversely extending block member or support 216 which is secured, in any suitable manner, as by welding, to the transversely extending portion 205a of the supporting frame. The elongated slots 216a permit the sleeves 217 and threaded rods to have some play or freedom of movement in the event of distortion of frame 205, 205a, or any misalignment of the parts.

The threaded rods 215 extend forwardly and, as shown, downwardly at opposite sides of the side walls of the hopper 206 and their forward end portions are adjustably secured in the flanges of suitable bracket members 218 carried by the outer faces of the hopper side walls. The end portions of the rods 215 slidably engage openings formed in the flanged brackets 218 and are adjustably held in position with respect to the brackets by a plurality of nuts and lock nuts 219 and 220, respectively. The rear end portions of the adjustable rods 215 pass through the sleeves 217 and are held or clamped in fixed relation to said sleeves by nuts 221 and lock nuts 222 which are adapted to be tightened down against spaced washers 223 associated with the opposite ends of the sleeves 217, see Figure 12. It will be understood that since the brackets 218 are fixed to the walls of the hopper 206 and since the block member or support 216 is fixed to the transverse frame portion 205a, adjustment of the members 215 relative to the brackets 218 and member 216 will serve to shorten or lengthen the threaded rods and to move the bearing ring or face 206a of the hopper toward or away from the bearing ring or member 202 of the mixing drum so as to vary the space or joint 224 between the opposed faces of rings 202 and 206a.

From the foregoing description it will be understood that the position of the hopper bearing ring 206a with relation to the mixing drum bearing ring 202 may be varied by releasing the various nuts and lock nuts previously referred to and moving the threaded rods 215 and with them the hopper, toward or away from the rear open end of the mixing drum. If the frame members or portions 203, 205, 205a should become distorted with relation to the remaining structure, the rods 215 may be independently adjusted so as to properly align the opposed bearing rings or members 206a and 202 and the interposed sealing means. The suspending adjustable link members 211 which suspend or support the hopper independently of the mixing drum permit relative alignment of the hopper with the drum by virtue of the movable connections or pivots 212 and 213 and, together with the adjustable rods 215, provide for a floatingly suspended hopper and for the accurate aligning of the opposed bearing members or rings as well as for the provision of a space or clearance between the rings which can be adjusted to any desired and predetermined size. Moreover, by locating the suspending means or members, as well as the space varying or adjusting means outside the hopper 206, we provide the machine or apparatus with a hopper which is interiorly unobstructed, as previously stated.

Figure 13:
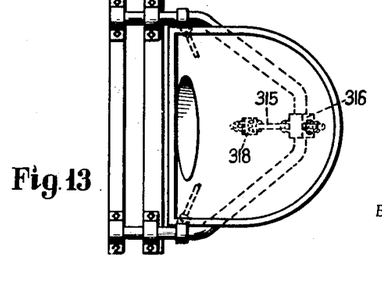
Figure 13 is a view similar to Figure 11, on a smaller scale, showing a modified form of improved means for adjusting or regulating the size of the sealing joint between the mixing drum and hopper.

Referring now particularly to Figure 13, we have shown a modification of improved means for providing a space or clearance between the opposed faces or surfaces of the sealing rings or members. In this form of our invention the structure is substantially the same as that shown in Figures 10, 11 and 12 except that one of the adjustable threaded rods 215 has been eliminated and a single adjustable rod 315 provided in lieu thereof. The inner end portion of the rod 315 is adjustably attached to a fixed bracket or supporting member 318 carried by the outer surface of a wall of the hopper 206 and the opposite or rear end portion of the rod is attached to a supporting block or member 316 in substantially the same manner as the rods 215 are adjustably connected or attached to the supporting member or block 216 of the preceding views.

As in the form of our invention shown in Figures 10 to 12, inclusive, the members 315, 316 and 318 shown in Figure 13 provide for the proper and desired adjustment of the space or clearance between the adjacent sealing rings or members carried by the hopper and the mixing drum.

From the foregoing it will be seen that we have provided improved sealing means adapted particularly, although not exclusively, for use with mixing apparatus of the portable type in which the charge of materials is mixed during transit, and in which the sealing means functions to exclude all foreign matter or material from the joint between the rotatable and non-rotatable units and particularly the material of the mix in the mixer. It is to be understood also, as stated above, that our sealing means may be formed from any desirable material which preferably has the characteristic of being lubricant-resisting and that said sealing means has various other uses. Its use in connection with portable mixers as shown in the drawings is merely by way of illustration and not of limitation.

It will also be seen that in several forms of our invention we have provided an improved mixing apparatus and improved sealing means therefor in which the hopper is independently supported or suspended with relation to the mixing drum and in floating relation thereto and in which means is provided for adjusting or regulating the space or clearance between the hopper sealing ring or surface and the mixing drum sealing ring or surface, and wherein said means are all located externally or outside of the hopper so as to leave the interior of the hopper free and unobstructed to thus permit the free flow or passage of materials therethrough.

Having thus described our invention, what we claim is:

1. A seal for sealing the space between a pair of relatively flat opposed faces arranged in spaced relation in which one of said faces is rotatable relative to the other of said faces and wherein one of the faces is provided with a dovetailed slot, and sealing means comprising an annulus formed from synthetic rubber and having an enlarged base portion adapted to be forced into said slot to hold said member in position with relation to said faces.

2. A seal according to claim 1 wherein the sealing means comprises a pair of annular members having enlarged base portions and wherein one of the faces is provided with a pair of spaced dovetailed slots for receiving and supporting the base portions of said annular sealing members.

3. Sealing means for a mixer structure in which said structure includes a rotatable mixing drum having an opening formed in one end thereof and a non-rotatable material-receiving hopper adjacent to but spaced from the drum and cooperable with the drum opening, said sealing means comprising a pair of spaced annular ring-like flexible members having enlarged base portions interposed between the mixing drum and hopper and carried by one thereof, said hopper or mixing drum having means for receiving and supporting said enlarged base portions to hold the sealing means in operative relation to said hopper and drum.

4. Sealing means for a mixer structure in which said structure includes a rotatable mixing drum having an opening formed in one end thereof and a non-rotatable material-receiving hopper adjacent to but spaced from the drum and having an opening cooperable with the drum opening; said sealing means comprising an annulus formed from flexible grease and mixture-resisting and excluding material of channel-shaped cross-section.

5. Sealing means for a mixer structure in which said structure includes a rotatable mixing drum having an opening formed in one end thereof and a non-rotatable material-receiving hopper adjacent to but spaced from the drum and having an opening cooperable with the drum opening; said sealing means comprising an annulus of channel-shaped cross-section having a base portion carried by the hopper and spaced flexible portions engaging the mixing drum.

6. In combination with a rotatable mixing drum having an opening formed in the rear end thereof, a hopper having an unobstructed interior for receiving material mounted adjacent said drum opening, opposed sealing surfaces carried by said drum and hopper, means located exteriorly of said hopper for floatingly suspending the hopper with relation to said drum, and means also located exteriorly of the hopper and comprising a pair of transversely spaced longitudinally extending adjustable rods for varying the position of the hopper with relation to the mixing drum.

7. A structure according to claim 6, wherein said first-named means includes an auxiliary frame for floatingly supporting the hopper independently of the mixing drum, and wherein said last-named means comprises an adjustable rod interposed between an exterior surface of the hopper and a portion of said auxiliary frame whereby to adjust the space between the opposed sealing surfaces.

8. A portable mixer having in combination, a rotatable mixing drum provided with a combined charge and discharge opening located at one end thereof, a material-receiving hopper located adjacent said drum opening and cooperable therewith, said drum and hopper having opposed spaced substantially parallel faces, sealing means comprising an annulus of normally channel-shaped cross-section formed from flexible lubricant and concrete mix-resistant material having portions thereof normally lying substantially flatwise between the adjacent substantially parallel opposed faces on the drum and hopper, means for supplying a quantity of grease under pressure to the space between the opposed faces of the drum and hopper in the region of said sealing means whereby the grease supplied to said region applies pressure to said sealing means to resist with said means the entry of material from the drum and hopper into said space, and means for maintaining said drum and hopper in predetermined spaced relation, said last-named means being adjustable to vary the space between the drum and hopper.

9. In combination with a rotatable mixing drum for concrete or the like having an opening at one end thereof, a material-receiving hopper having an opening in its inner end portion in cooperative relationship with said drum opening, means for connecting the hopper to the drum in predetermined spaced relation thereto and in position to feed material thereinto through the drum opening, said drum and hopper having flanges extending outwardly therefrom in the same direction and in relatively closely spaced relationship to provide a space therebetween, the inner opposed faces of said flanges extending substantially in parallel planes, means for supplying lubricant under pressure to said space, and means for sealing the space between the opposed faces of the flanges, said means comprising a pair of transversely spaced annular ring-like members formed from flexible lubricant and mix-resistant material located in said space and attached to one of said faces, the free portion of the innermost sealing member normally engaging the other of said faces and having its edge extending to and terminating substantially flush with the inner adjacent surfaces of the drum and hopper whereby with the lubricant under pressure to prevent the entry of fines into said space and said means preventing the leakage of lubricant from within the space.

10. In combination with a rotatable mixing drum for concrete or the like having an opening at one end thereof, a material-receiving hopper having an opening in its inner end portion in cooperative relationship with said drum opening, means for connecting the hopper to the drum in predetermined spaced relation thereto and in position to feed material thereinto through the drum opening, said drum and hopper having flanges extending outwardly therefrom in the same direction and in relatively closely spaced relationship to provide a space therebetween, the inner opposed faces of said flanges extending substantially in parallel planes, a pair of annular grooves formed in one of said flanges on the inner face thereof, means for supplying lubricant under pressure to said space, and sealing means including a pair of annular flexible sealing members one thereof positioned and held in each of said grooves, said sealing members having their free end portions normally lying substantially in the same plane within the space between the inner opposed faces of the flanges and in substantially flatwise engagement with said faces, the free edge portion of the innermost sealing member extending inwardly to and terminating substantially flush with the adjacent inner surfaces of the drum and hopper whereby to provide with the lubricant under pressure within said space means for preventing the ingress of fines into the space.

GEBHARD JAEGER.
CLARENCE I. BOHMER.

REFERENCES CITED

The following references are of record in the file of this patent:

UNITED STATES PATENTS

| Number | Name | Date |
| --- | --- | --- |
| 2,013,499 | Meckenstock | Sept. 3, 1935 |
| 2,265,751 | Ball | Dec. 9, 1941 |
| 2,267,801 | Peters et al. | Dec. 30, 1941 |
| 2,277,518 | Jaeger et al. | Mar. 24, 1942 |
| 2,281,820 | Ball | May 5, 1942 |
| 2,316,137 | Visser | Apr. 6, 1943 |